(12) United States Patent
Suzuki

(10) Patent No.: US 11,371,514 B2
(45) Date of Patent: Jun. 28, 2022

(54) AXIAL FLOW BLOWER

(71) Applicant: YAMABIKO CORPORATION, Tokyo (JP)

(72) Inventor: Kenji Suzuki, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 299 days.

(21) Appl. No.: 16/676,193

(22) Filed: Nov. 6, 2019

(65) Prior Publication Data

US 2020/0137966 A1    May 7, 2020

(30) Foreign Application Priority Data

Nov. 7, 2018 (JP) .............................. JP2018-209409

(51) Int. Cl.
*F04D 19/00* (2006.01)
*F04D 29/52* (2006.01)
(Continued)

(52) U.S. Cl.
CPC ............ *F04D 19/002* (2013.01); *A01G 20/47* (2018.02); *B08B 5/02* (2013.01); *F04D 29/522* (2013.01);
(Continued)

(58) Field of Classification Search
CPC ...... F04D 19/00; F04D 19/002; F04D 29/522; F04D 29/542; F04D 29/545;
(Continued)

(56) References Cited

U.S. PATENT DOCUMENTS 2,294,586 A * 9/1942 Troller .................. F04D 29/684
417/368
9,737,182 B2    8/2017 Gindele et al.
(Continued)

FOREIGN PATENT DOCUMENTS

DE        4423447 A1    1/1996
JP        6368616 B2    5/2016
WO     2008/109038 A2    9/2008

OTHER PUBLICATIONS

Lacour, English Translation of DE-4423447 ('DE4423447A_MT'), Jan. 1996 (Year: 1996).*

(Continued)

*Primary Examiner* — Kenneth J Hansen
(74) *Attorney, Agent, or Firm* — Maschoff Brennan

(57) ABSTRACT

An axial flow blower comprises a housing having a suction opening and an ejection opening formed thereon and having an air blow passage formed therein through which the suction opening and the ejection opening are in communication with each other, a motor case disposed in the air blow passage, a motor housed in the motor case, an air blow fan connected with a driven section of the motor and configured to rotate on a driving force of the motor to blow air from the suction opening toward the ejection opening and an air communication passage provided between an outside of the air blow passage and an inside of the motor case. An outflow hole is bored through the motor case and in communication with the air blow passage and an outer space outside the housing is in communication with an inner space inside the motor case through the air communication passage.

5 Claims, 5 Drawing Sheets

(51) Int. Cl.
| | |
|---|---|
| *F04D 29/58* | (2006.01) |
| *F04D 29/54* | (2006.01) |
| *A01G 20/47* | (2018.01) |
| *B08B 5/02* | (2006.01) |

(52) U.S. Cl.
CPC ......... *F04D 29/542* (2013.01); *F04D 29/584* (2013.01)

(58) Field of Classification Search
CPC ........ F04D 29/584; F04D 25/082; A47L 5/14; A47L 249/22; A01G 20/47
See application file for complete search history.

(56) References Cited

U.S. PATENT DOCUMENTS

| | | | |
|---|---|---|---|
| 2014/0321995 A1* | 10/2014 | Beers | ................... F04D 25/06 415/175 |
| 2015/0143657 A1 | 5/2015 | Gindele et al. | |
| 2016/0107202 A1 | 4/2016 | Suzuki et al. | |
| 2017/0021489 A1* | 1/2017 | Bylund | ................... F04D 25/06 |

OTHER PUBLICATIONS

European Search Report in Application No. 19207575.2 dated Mar. 19, 2020.

\* cited by examiner

AXIAL FLOW BLOWER

CROSS REFERENCE TO RELATED APPLICATIONS

This application claims the foreign priority benefit under 35 U.S.C. § 119 of Japanese Patent Application No. 2018-209409 filed on Nov. 7, 2018, the disclosure of which is incorporated herein by reference.

FIELD OF THE INVENTION

The present invention relates to an axial flow blower.

DESCRIPTION OF THE RELATED ART

An axial flow blower (Air blower) to eject a high speed air flow to blow away fallen leaves and dust comprises a housing in which an air blow passage is formed, a motor case disposed in the air blow passage, a motor housed in the motor case and an air blowing fan connected with a driven section of the motor. Such an axial flow blower is configured to create an air flow directed from a suction opening to an ejection opening by the air blowing fan being driven by a diving force of the motor.

There is a conventional axial flow blower comprising a housing having an outer wall through which an air communication hole is formed, and ambient air is taken into an air blow passage through the communication hole (For example, JP6368616B2). There is another axial flow blower comprising a motor case having an air communication hole that is formed through the motor case so that the inside of the motor is in communication with the air blow passage to have the motor cooled down (For example, see U.S. Pat. No. 9,737,182B2).

SUMMARY OF THE INVENTION

In the case of the conventional axial flow blower as above described, it is hardly expected that the motor housed in the motor case is cooled down. In the case of the axial flow blower comprising the motor case having the air communication hole that is formed through the motor case, since it is difficult for the high speed air flow running in the air blow passage to come into the motor case, the cooling effect on the motor is not so good as expected.

The present invention is intended to work out the problems as mentioned and has an objective to provide an axial flow blower capable of efficiently cooling down a motor in a motor case disposed in an air blow passage.

In order to achieve the above objective, an axial flow blower of the present invention comprises a housing including a suction opening and an ejection opening formed thereon and including an air blow passage formed therein through which the suction opening and the ejection opening are in communication with each other. The axial flow blower further comprises a motor case disposed in the air blow passage and a motor housed in the motor case. The axial flow blower further comprises an air blow fan connected with a driven section of the motor and configured to rotate on a driving force of the motor to blow air from the suction opening toward the ejection opening and an air communication passage provided between an outside of the air blow passage and an inside of the motor case. There is an outflow hole that is bored through the motor case and in communication with the air blow passage and an outer space outside the housing is in communication with an inner space inside the motor case through the air communication passage.

According to the axial flow blower of the present invention, when the air blow fan rotates to generate an air flow in the air blow passage, an inside of the air blow passage has a lower pressure than the an inside of the motor case does and the air in the motor case is suctioned into the air blow passage. As a result, there is an air suction action generated in the motor case, with which the ambient air is suctioned into the motor case through the air communication passage, air flows from the air communication passage to the outflow hole formed in the motor case and this air flow cools down the motor. In addition, the air in the motor case flows out of the outflow hole into the air blow passage and thus used efficiently.

The axial flow blower of the present invention is capable of introducing the ambient air into the motor case reliably and efficiently into the motor case to generate an air flow in the motor case that cools down the motor.

DETAILED DESCRIPTION OF THE INVENTION

Figure 1:
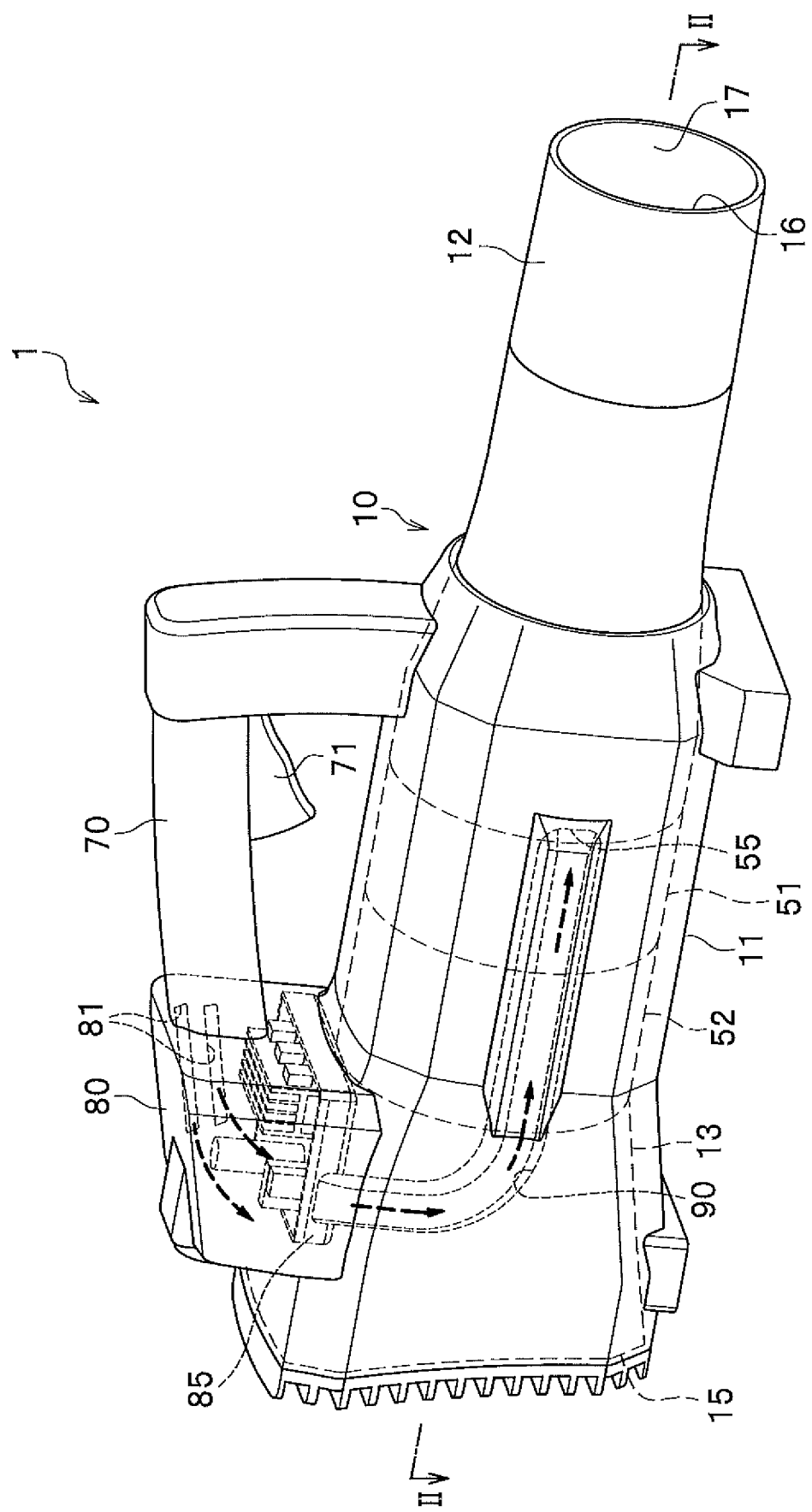
FIG. 1 is a whole perspective view of an axial flow blower according to an embodiment of the present invention.
Figure 2:
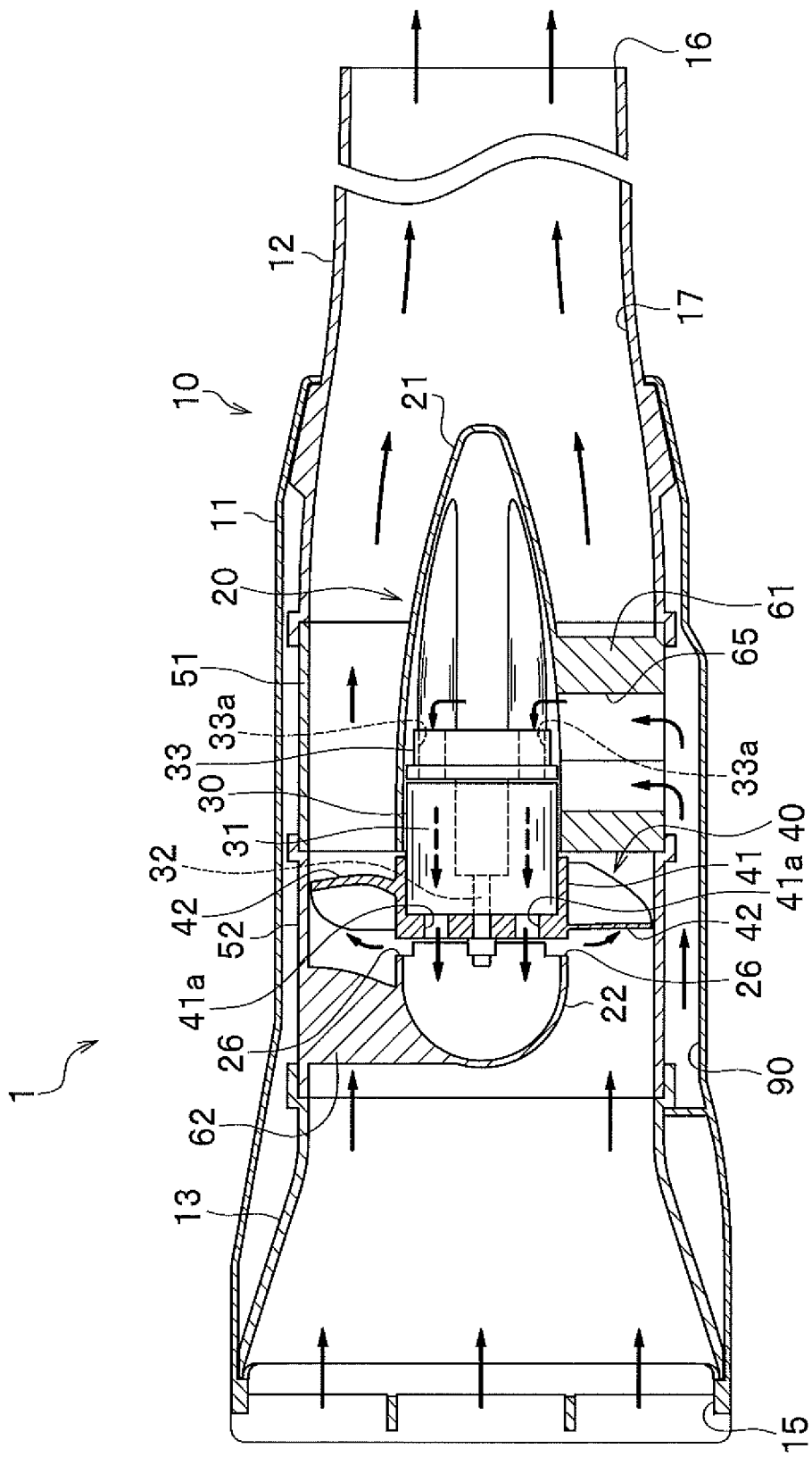
FIG. 2 is a cross section view of the axial flow blower shown in FIG. 1 that is cut along a plane through a line II-II.

An exemplary embodiment of the present invention is explained appropriately with reference to figures that are attached. As shown in FIG. 1, an axial flow blower 1 of the present embodiment comprises a housing 10 in which an air blow passage 17 is formed from an intake opening 15 to an ejection opening 16. As shown in FIG. 2, in an air blow passage 17 are provided a motor case 30, an air blowing fan 40 connected with the motor 20 and flow directing plates 61, 62. One of the flow directing plates 61, 62 is disposed on an upstream side of the air blowing fan 40 and the other of them is on a downstream side of the air blowing fan.

The axial flow blower 1 rotates the air blowing fan 40 on a driving force of the motor 30 to generate a high-speed air flow from the intake opening 15 toward the ejection opening 16 and eject the high-speed air flow outside.

An operator is able to direct the ejected air flow from the ejection opening toward the ground to blow away fallen leaves and dust while holding the axial flow blower.

The housing 10 has a main body portion 11 and receives a blow pipe 12 that protrudes forward from the main body portion.

The main body portion 11 is made of resin and in a box shape and has a rear opening through its rear end face and a front opening through its front-end face. As shown in FIG. 2, there is a suction pipe 13 that is formed in the main body 11 and extends in the front-and-rear direction. A rear end portion of the suction pipe 13 opens through the rear end face of the main body 11 and constitutes a suction opening 15.

A blow-out pipe 12 is a cylindrical member made of resin extending in the front-and-rear direction. A rear portion of the blow-out pipe 12 is inserted into the main body portion 11 through a front side opening of the main body. A front portion of the blow-out pipe 12 protrudes forward through the front opening of the main body 11. The blow-out pipe 12 has a front opening at its front end that forms an ejection opening 16. An opening area of the ejection opening 16 is smaller than an opening area of the suction opening 15.

The blow-out pipe 12 and the suction pipe 13 are connected with each other through a couple of outer cylindrical bodies 51, 52. Both of these outer cylindrical bodies 51, 52 are cylindrical members made of resin (See FIG. 3) and are configured to have a diameter equal to that of a rear end portion of the blow-out pipe 12 and that of a front end portion of the suction pipe 13.

A front-end portion of the outer cylindrical body 51 that is disposed on the front side of the outer cylindrical body 52 is connected with a rear end portion of the blow-out pipe 12. A front-end portion of the outer cylindrical body 52 is connected with a rear end portion of the outer cylindrical body 51. A rear end portion of the outer cylindrical body 52 is connected with a front-end portion of the suction pipe 13.

An inner space defined by the blow-out pipe 12, the outer cylindrical bodies 51, 52 and the suction pipe 13 forms an air blow passage 17. The air blow passage 17 is an air communication passage extending in the front-rear direction from the suction opening 15 to the ejection opening 16.

A motor case 20 is a case that is made of resin and disposed in the housing 10. The motor case 20 comprises a front case 21 and a rear case 22.

The front case 21 is a member in a cylindrical shape and disposed more or less at a center in the air blow passage 17. A rear end face of the front case 21 has an opening in a circular shape and a front-end portion of the front case 21 is closed and in a cone shape.

Figure 3:
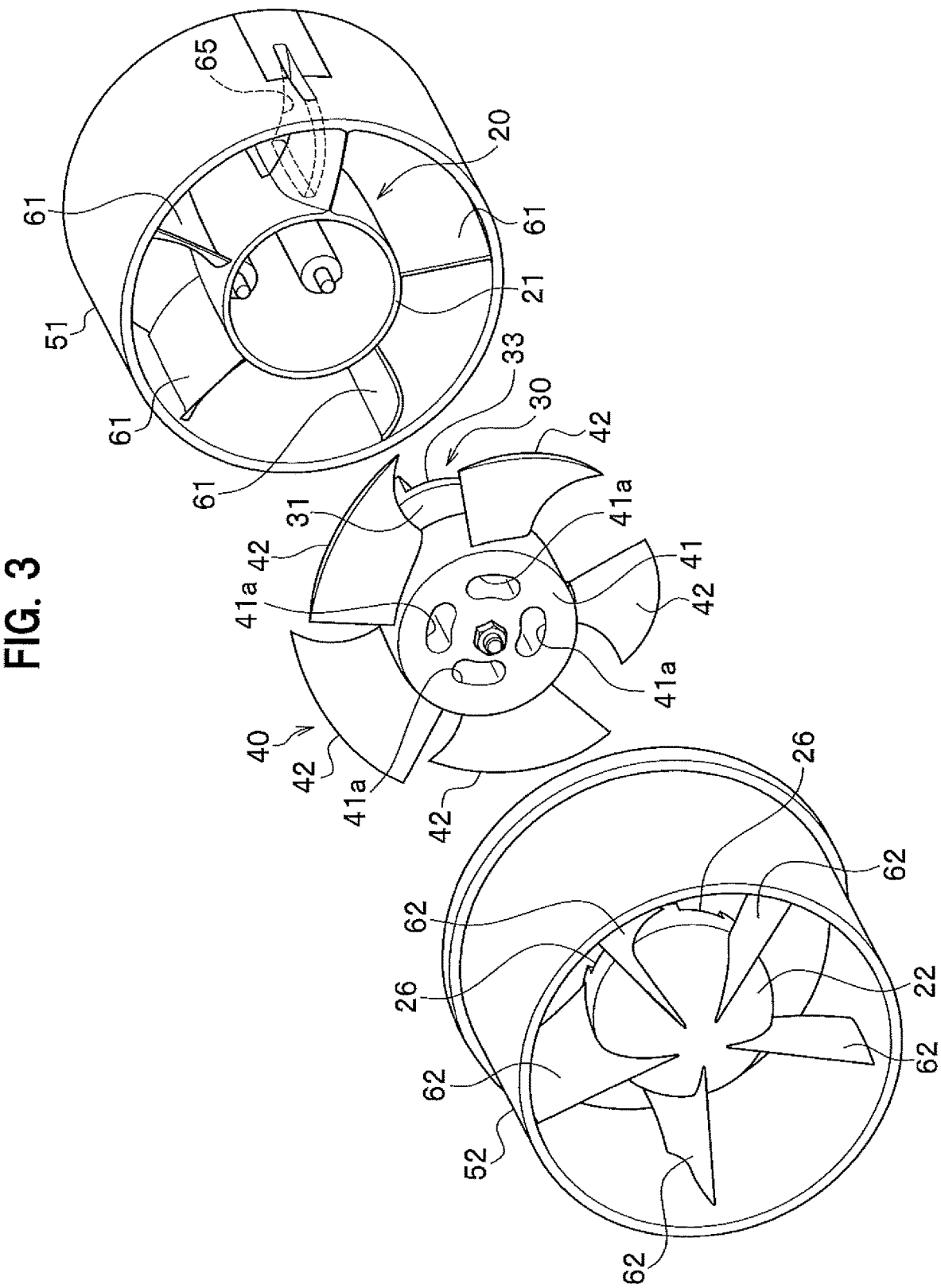
FIG. 3 is a perspective exploded view of a motor case and an air blowing fan of an axial flow blower.

The front case 21 is disposed at the center position in the outer cylindrical body 51. A front portion of the front case 21 projects from the outer cylindrical body 51. As is seen in FIG. 3, the front case 21 is supported by plural front flow directing plates 61 extending inward from the outer cylindrical body 51.

The front flow directing plates 61 are formed between an inner face of the front outer cylindrical body 51 and an outer face of the front case 21. The front flow directing plates 61 are plate members of resin extending in the radial direction of the air blow passage 17. An inner end portion of each front flow directing plate 61 is connected to an outer circumferential face of the front case 21. An outer end portion of each flow directing plate 61 is joined to an inner circumferential face of the outer cylindrical body 51. The flow directing plate 61 is a support plate formed between the inner face of the air blow passage 17 and the outer face of the motor case 20.

Each of the flow directing plates 61 according to the present embodiment is configured to uniformly direct the air flow in the air blow passage 17. A plurality of the flow directing plates 61 are disposed circumferentially at constant intervals along the inner surface of the outer cylindrical body 51. The front case 21, the flow directing plates 61 and the outer cylindrical body 51 may be integrally formed into a single member.

As shown in FIG. 2, there is an air communication passage 65 that is formed inside one of the flow directing plates 61 and is in communication with an outer space outside the housing 10 (outside the air blow passage 17). In addition, the air communication passage 65 runs through a wall of the front case 21 so as to be in communication with an inner space of the front case 21 (inside the motor case 21). Accordingly, the outer space outside the outer cylindrical body 51 is in communication with the inner space inside the front case 21 through the air communication passage 65.

As shown in FIG. 3, the flow directing plate 61 through which the air communication passage 65 is formed has an approximately front half portion that is formed in such a way that the front half portion is coupled to a part of the outer cylindrical body 51 and a part of the front case 21 and can be attached to and detached from the rest of the flow directing plate 61. As a result, the air communication passage 65 is opened by removing off the front half portion of the flow directing plate 61.

The axial flow blower 1 of the present embodiment has each of the flow directing plates 61 formed of plural members. However the flow directing plate 61 may be formed of a single member, which may be formed with such a metal mold as can be separated in a direction in which the air communication passage 65 (a radial direction of the front case 21) extends to facilitate the production (molding).

The axial flow blower 1 of the present embodiment has the rear case 22 disposed behind the front case 21. The rear case 22 and the front case 21 are spaced apart from each other in the front-rear direction. The rear case 22 is supported by plural rear flow directing plates 62 and located at the center position in the rear outer cylindrical body 52.

The rear case 22 has a rear portion that is closed by a half spherical surface and a front-end face having an opening in a circular shape. The front-end portion of the rear case 22 has plural outflow holes 26 bored through in the radial direction.

As shown in FIG. 3, each of the rear flow directing plates 62 is a support member formed between an inner face of the outer cylindrical body 52 (air blow passage 17) and an outer face of the rear case 22. The rear case 22, the flow directing plates 62 and the outer cylindrical body 52 of the present embodiment may be integrally formed into a single member.

The motor 30 is an electric motor and housed in the motor case 20, as shown in FIG. 2. The motor 30 comprises a driven section 31 and a fixed section 33.

The driven section 31 includes various components inclusive of a magnet which are housed in a case in a cylindrical shape. The driven section 31 has a front-end face with an opening and a rear-end face with an opening. The driven section 31 is secured to an axis rod 32.

The fixed section 33 is a stator including coils surrounded by magnets in the driven section 31. A front-end portion of the fixed section 33 protrudes forward from a front-end section of the driven section 31. The motor 30 is configured to rotate the driven section 31 about an axis of the axis rod 32 when a current is passing through the coils in the fixed section 33.

The fixed section 33 is fixed in the front case 21. With the fixed section 33 fixed in the front case 21, the front portion of the driven section 31 is located inside the front case 21 while a rear portion of the driven section 31 protrudes rearward from the front case 21.

The fixed section 33 has plural opening portions 33*a* that extend in the front-rear direction through the fixed section 33. An inner space inside the driven section 31 is in communication with the inner space of the front case 21 through each of the opening portions 33*a* of the fixed section 33.

A blowing fan 40 is disposed between the front case 21 and the rear case 22 and comprises a connection part 41 and plural blades 42.

The connection part 41 is a circular plate member and has a front surface on which a circular recess is formed. The rear portion of the driven section 31 of the motor 30 is inserted into the recess. The driven section 31 is fitted onto the connection part 41 and is secured to the rear portion of the driven section 31.

A cylindrical portion 41a of the connection part 41 is rotatable relative to the front case 21 and the rear case 22, and forms a part of the motor case 20 as an intermediate case between the front case 21 and the rear case 22.

In addition, the connection part 41 has plural opening portions that run in the front-rear direction through the connection part 41. The inner space of the driven section 31 is in communication with an inner space of the rear case 22 through each of the cylindrical portions 41a.

The axial flow blower 1 according to the present embodiment has plural blades 42 extending radially outward from a circumferential face of the connection part 41. When the motor 30 is driven to rotate the driven section 31 and the blowing fan 40, air is blown from a rear end toward a front end inside the air blow passage 17 by the blades 42 that are rotating.

As shown in FIG. 2, the axial flow blower 1 generates a high-speed air flow from the suction opening 15 to the ejection opening 16 when the air blowing fan 40 is rotated on the driving force of the motor 30.

The axial flow fan 1 has the motor 30 disposed inside the motor case 20 and between the air communication passage 65 to the front case 21 and the outflow holes 26 through the rear case 22. The inner space of the front case 21 is in communication with the inner space of the rear case 22 through each of the opening portions 33a of the fixed section 33, the inner space of the driven section 31 and each of the opening portions 41a of the connection part 41.

In addition, the outflow holes 26 of the rear case 22 are disposed on the rear side of the air blowing fan 40 where the suction opening 15 is. The inner space of the rear case 22 is in communication with the air blow passage 17 through the outflow holes 26.

The axial flow blower 1 has a handle 70 attached to an upper face of the main body 11, as shown in FIG. 1. The handle 70 is a cylindrical member extending in the front-rear direction and to be gripped by an operator. A front-end portion and a rear end portion of the handle 70 are fixed to the upper face of the main body 11. A throttle lever 71, which is an operation means for an operator to increase and decrease a rotation speed of the driven section 31 of the motor 30 while gripping the handle 7, is provided at a front portion of the handle 70.

In order to blow away fallen leaves and dirt with the axial flow blower 1, an operator holds the axial flow blower 1 while gripping the handle 70. Then, the operator operates the throttle lever 71 of the handle 70 to rotate the air blowing fan 40 to generate a high-speed air flow in the air blow passage 17 and direct the high-speed air flow from the ejection opening 16 toward the ground.

The main body 11 of the axial flow blower 1 has a control case 80 and a guide passage 90 that is in communication with an inside of the control case 80 formed thereon.

The control case 80 is formed on the rear end portion of the handle 70. There are plural intake holes 81 bored through a left side wall of the control case 80. An inner space of the control case 80 is in communication with the outside space (atmosphere) through each of the intake holes 81.

The control case 80 receives a control device 85 to control driving the motor 30. The control device 85 contains various electrical components mounted on a substrate. The control device 85 is connected with an outside power source through a power source cable (not shown). The control device 85 is connected with the throttle lever 71 through a signal cable (not shown) that runs through the handle 70.

The control device 85 is connected with the motor 30 through a power supply cable (not shown). This power supply cable connected with the motor 30 passes through the air communication passage 65 in the flow directing plate 61 into the motor case 20 as shown in FIG. 2. When the power supply cable is made to pass through the sir communication passage 65, the power supply cable can be inserted into the air communication passage 65 with an approximately front half of the flow directing plate 61 removed off.

The guide passage 90 is formed on a right side wall portion of the housing 10 as shown in FIG. 1 and has one end portion (rear end portion) through which the guide passage 90 is in communication with an inside of the control case 80 and the other end portion (front end portion) through which the guide passage 90 is in communication with the air communication passage 65 as shown in FIG. 2.

The inner space of the motor case 20 in the axial flow blower 1 is in communication with the outside space (atmosphere) through the intake holes 81 (See FIG. 1), the inner space of the control case 80, the guide passage 90 and the air communication passage 65.

When the air blowing fan 40 is rotating to generate a high speed air flow in the air blow passage 17, the pressure in the air blow passage 17 is lower than the pressure in the motor case 20 and then the air in the motor case 20 is suctioned into the air blow passage 17 through each of the outflow holes 26.

In addition, when the air flow is generated in the air blow passage 17, the downstream side of the air blow fan 40 in the air blow passage 17 (where the ejection opening 16 is) has a lower pressure than the upstream side of the air blow fan 40 (where the intake opening 15 is) does. Since the outflow holes 26 are disposed upstream of the air blow fan 40, the air in the motor case 20 is efficiently suctioned into the air blow passage 17.

In this case, a cross section area orthogonal to the axis of the air blow passage 17 has an influence on how much lower the air pressure in the air blow passage 17 is. Taking this into consideration, the outflow holes 26 should be formed in the region of the rear case 22 where the cross section area orthogonal to the axis is smaller. Moreover, the opening direction of the outflow holes 36 has an influence on how much lower the air pressure in air blow passage 17 is as well. Taking this into consideration, the opening direction of the outflow holes 26 should be orthogonal to the direction in which air flows in the air blow passage 17.

There is an air suctioning action in the motor case 20 caused by the air in the motor case 20 being suctioned into the air blow passage 17. Due to this air suctioning action, the ambient air is suctioned into the inner space of the control case 80 through the intake holes 81, as indicated in FIG. 1. The ambient air suctioned into the control case 80 cools down the control device 85 in the control case 80.

In addition, the air in the control case 80 further flows into the front case 21 of the motor case 20 through the guide passage 90 and the air communication passage 65. Then the air flowing into the front case 21 further flows into the rear case 22 through the driven section 31. The air flowing through the driven section 31 cools down the motor 30. The air flowing into the rear case 22 is further suctioned into the air blow passage 17, whose pressure is lower, through each of the outflow holes 26 and joins the air flow inside the air blow passage 17. The axial flow blower 1 makes efficient use of the ambient air suctioned into the motor case 20 as the air flow in the air blow passage 17.

As has been explained, the axial flow blower 1 of the present embodiment is capable of introducing the ambient air reliably and efficiently into the motor case 20 to generate an air flow in the motor case 20, which efficiently cools down the motor 30.

Moreover, the axial flow blower 1 of the present embodiment has the flow directing plates 61 that work to support the motor case 20 as well as to uniformly direct the air flow in the air blow passage 17. At least one of the flow directing plates 61 has an air communication passage 65 formed thereinside that is in communication with the inside of the motor case 20. This configuration is capable of introducing the ambient air reliably into the inside of the motor case 20, though it has a relatively simple structure in the housing 10.

Although one exemplary embodiment of the present invention has been explained as above, it should be noted that the present invention is not limited to the above explained embodiment and that there are various possible modifications within the scope of the present invention.

For instance, the axial flow blower 1 of the present embodiment introduces the ambient air into the air communication passage 65 through the control case 80 and the guide passage 90. However, the axial flow blower 1 may do without the guide passage 90 and introduce the ambient air into the air communication passage 65 without the ambient air passing through the guide passage 90.

The axial flow blower 1 of the present embodiment has the motor case 20 supported inside the air blow passage 17 by the flow directing plates 61, as shown in FIG. 2. However, the motor case 20 may be supported inside the air blow passage 17 by other support members than the flow directing plates 61. The support member is not limited to the flow directing plate 61.

Figure 4:
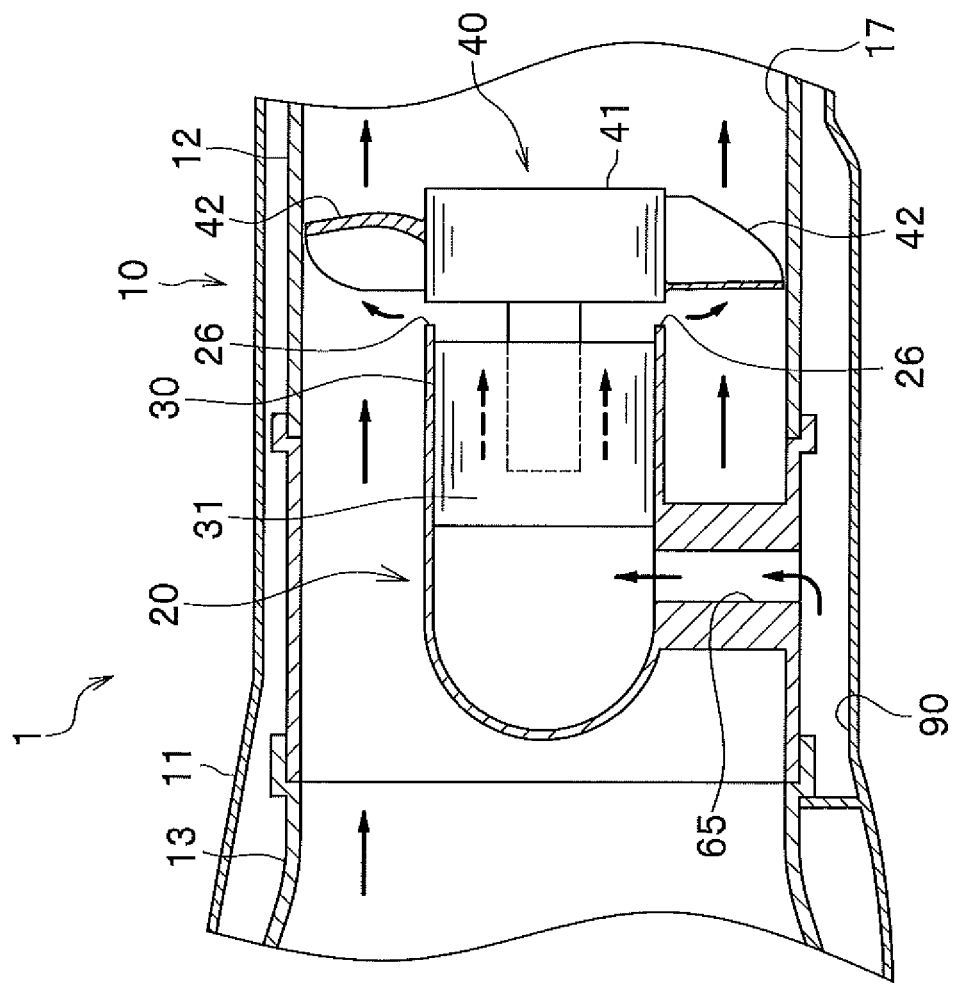
FIG. 4 is a cross section view of a modified configuration having an opening to the air blow passage that is formed on an upstream side of the motor and another opening of an outflow hole that is located on a downstream side of the motor.

The motor case 20 of the present embodiment has the air communication passage 65 that opens to the air flow in the air blow passage 17 downstream of the motor 30 and has the outflow holes 26 that open to the air flow in the air blow passage 17 upstream of the motor 30. The air blow fan 40 is disposed between the air communication passage 65 and the outflow holes 26. However, as shown in FIG. 4, the air communication passage 65 may open to the air flow in the air blow passage 17 upstream of the motor 30 while the outflow holes 26 open to the air flow in the air blow passage 17 downstream of the motor 30 with the air blow fan 40 disposed downstream of both the motor 30 and the outflow holes 26.

Figure 5:
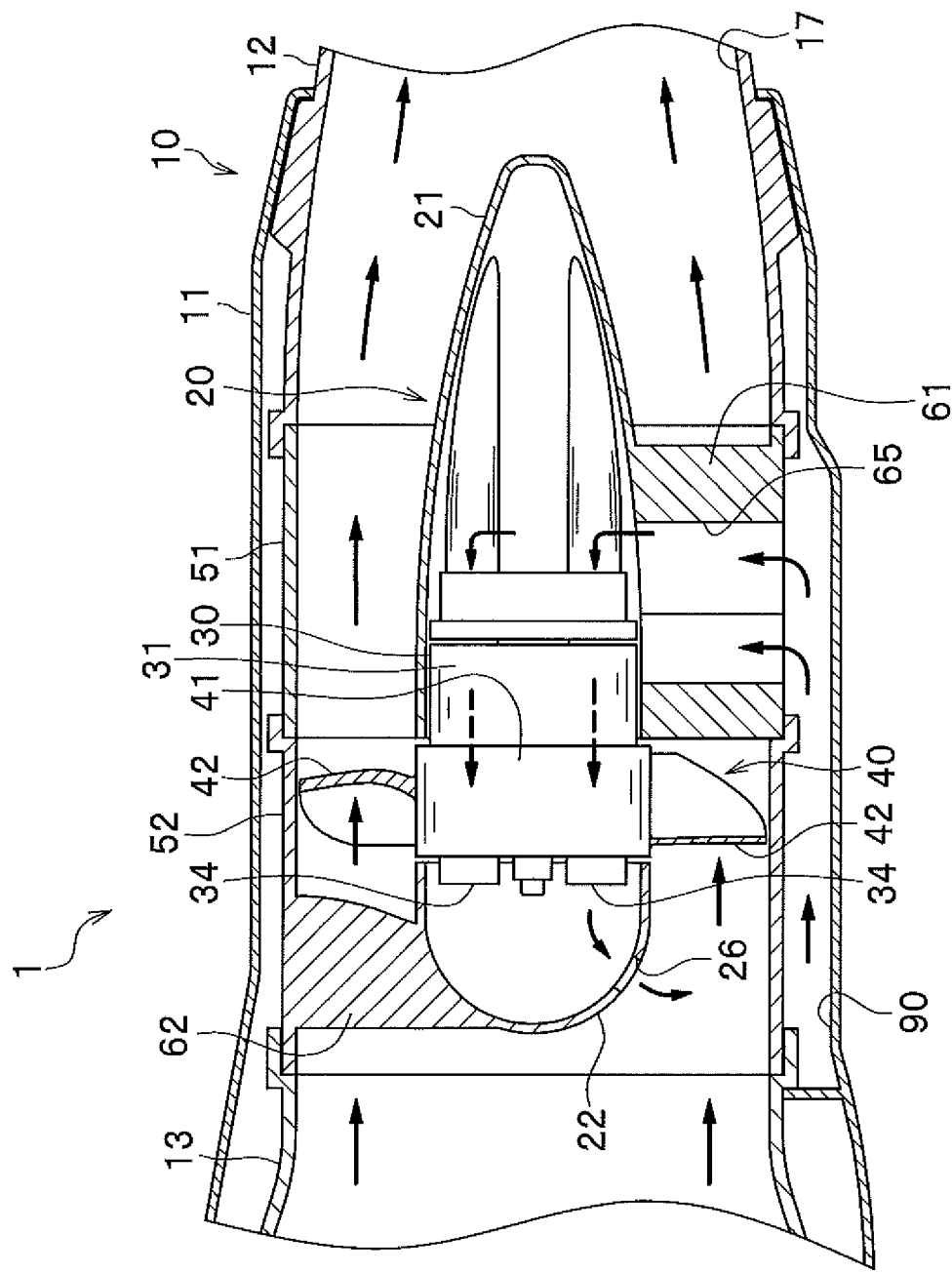
FIG. 5 is a cross section view of a configuration corresponding to a modified example having an internal fan disposed in the motor case.

As shown in FIG. 5, an internal fan 34 may be provided on a rear end face of the driven section 31 of the motor 30 and rotate in the rear case 22 on the driving force of the motor 30 to blow air rearward. In this configuration, the outflow holes 26 are bored through a rear portion of the rear case 22 so that air can be efficiently ejected out of the outflow holes 26 into the air blow passage 17 where the pressure is lower. Furthermore, the internal fan may be provided to make more uniform the air flow disturbed when passing through the connection part 41 that is rotating.

In the configuration as shown in FIG. 5, the internal fan 34 is attached directly on the rear end face of the driven section 31. However, the configuration of the internal fan is not limited to this configuration, and an internal fan may be provided separately from the driven section 31 and connected with the driven section 31 through such a connection member as an axial member.

The invention claimed is:

1. An axial flow blower comprising:
a housing including a suction opening, an ejection opening formed thereon, and an outer cylindrical body to form an air blow passage through which the suction opening and the ejection opening are in communication with each other;
a motor case disposed in the air blow passage;
a motor housed in the motor case;
an air blow fan disposed in the air blow passage and connected with a driven section of the motor, the air blow fan being configured to rotate by a driving force of the motor to blow air from the suction opening toward the ejection opening; and
a flow directing plate, an outer end portion thereof being connected to an inner circumferential face of the outer cylindrical body and an inner end portion thereof being connected to an outer circumferential face of the motor case at a position downstream of the motor,
wherein the flow directing plate includes an air communication passage formed therein, and
wherein an outflow hole is bored through the motor case and in communication with the air blow passage, and an outer space outside the housing is in communication with an inner space inside the motor case through the air communication passage.

2. The axial flow blower as described in claim 1 wherein the outflow hole is disposed between the air blow fan and the suction opening.

3. The axial flow blower as described in claim 1 wherein the motor is disposed between the air communication passage and the outflow hole in the motor case.

4. The axial flow blower as described in claim 1 further comprising;
a control case that is formed on the housing and houses a control device to control driving the motor; and
a guide passage that is formed on the housing and in communication with an inside of the control case,
wherein the control case includes an intake hole bored therethrough to be in communication with the outer space outside the housing and the guide passage is in communication with the air communication passage.

5. The axial flow blower as described in claim 1 further comprising an internal fan that is disposed in the motor case and connected with the driven section and rotates by the driving force of the motor to blow air toward the outflow hole.

* * * * *